UNITED STATES PATENT OFFICE.

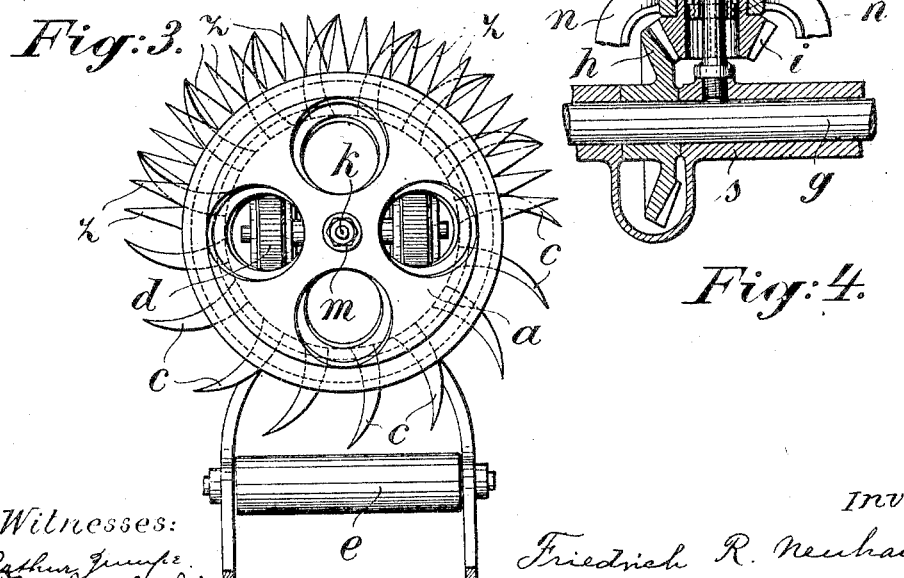

FRIEDRICH R. NEUHAUS, OF SOLINGEN, GERMANY.

LAWN-MOWER.

No. 797,596.   Specification of Letters Patent.   Patented Aug. 22, 1905.

Application filed May 20, 1905. Serial No. 261,315.

*To all whom it may concern:*

Be it known that I, FRIEDRICH R. NEUHAUS, a citizen of the German Empire, and a resident of Solingen, Germany, have invented certain new and useful Improvements in Lawn-Mowers, of which the following is a specification.

The usefulness of that class of lawn-mowers where horizontally-rotating blades and radial counter-blades cutting the grass in the way of a circular saw were employed was heretofore greatly impaired by the disadvantage that there were always some of the ends of the said blades or counter-blades which failed to cross at the proper moment, the result being that the grass-plants were in some places pushed aside by the rotating knives and laid down by the wheels of the machine, so that even when the latter was repeatedly passed over a spot on the lawn there still remained strips of uncut grass.

My invention relates to a lawn-mower of the construction referred to where the disadvantage described is obviated, the ends of all the knives and counter-blades of a machine embracing the grass-plants and duly crossing each other at once, so that the grass cannot be scrutched into the spaces between the blades, but is equally and cleanly cut off.

My device is illustrated on the drawings herewith, in which—

Figure 1 is a longitudinal section, Fig. 2 a transverse section, and Fig. 3 a plan, of a casing and knife hereinafter referred to, while Fig. 4 shows in section the operating mechanism and adjusting device, also referred to below.

As can be readily seen from the said illustrations, the counter-blade $a$ has been given the shape of a hood or bell provided with radial straight-edged cutting-teeth and is mounted either above or beneath another rotatory knife $b$, which is provided with sickle-shaped teeth or grips $c\ c$ and operated by the wheels or rollers $d$. The sickle-shaped teeth $c$ are provided with concave cutting edges, which are set back from the radii passing through the apexes of the teeth, so that segmental openings are formed between the radial teeth and the sickle-shaped teeth when their points meet.

The adjustment of the blades $a$ and $b$ for cutting the grass in any desired length, and which I do not mean to be a feature of my invention, may be brought about by providing the hood-shaped blade $a$, carrying the teeth $e$, with spiral thread, by means of which it may be adjusted, being screwed upon a bolt $k$, and may then be particularly secured by means of a nut $m$. The said bolt $k$ is secured to a casing $s$, in which the driving-shaft $g$ is supported and rotates with the hub of the wheel. The adjustment of the said blade $a$ adjusts at the same time the cutting-blade $b$, the latter carrying a journal-box $l$ concentric with another central box $u$, that carries blade $a$ and being, by means of a suitable key and corresponding groove, so arranged that it may slide in a miter-wheel $i$, by which it is set in motion. The said miter-wheel $i$, which is rotated by a wheel $h$ on the shaft $g$, is held fast and supported by the arms $n$, rigidly secured to the casing $s$, so that a disarrangement is obviated. When the said blades $a$ and $b$, provided, respectively, as aforesaid, with the cutting-teeth and grips, are to be adjusted to a certain height, this may be done by correspondingly adjusting the nut $m$ and the blade $a$, whereby the cutting-blade $b$ is lifted by means of a swelling $p$, provided at the bottom of the aforesaid box $u$ of the blade $a$, while the lowering of the blade $b$ may be effected by screwing down the said blade $a$.

The driving wheels or rollers $d$ may be mounted within the annular toothed cutting-blade $a$ so as to require no extra space and at the same time prevent the laying down of any grass. The cutting-blade $b$ is rotated by the wheels $d$, which are provided with an interior annular rack and meshing with the gears $f$, mounted on the said shaft $g$, the bevel-gear $h$ sitting, as aforesaid, on the said shaft $g$, engaging in the miter-wheel $i$, which drives the box $l$ with the cutting-blade $b$. Behind the rotating cutters there may be provided a guide-roller *e* to prevent a too easy tilting of the machine and to facilitate their continuous keeping in proper position during the work.

What I claim as my invention, and desire to protect by Letters Patent, is—

A lawn-mower provided with a blade having radial straight-edged teeth, and a rotatory coacting blade having sickle-shaped teeth, the concave cutting edges of which are set back from radii passing through the apexes of the teeth, whereby segmental openings are formed between the radial teeth and the sickle-shaped teeth, substantially as specified.

Signed by me at Solingen, Germany, this 6th day of May, 1905.

FRIEDRICH R. NEUHAUS

Witnesses:
   JUL. KOSSBAUER,
   W. R. ESTES.